Feb. 13, 1968  K. L. TREIBER  3,368,822
ROLLING FUEL TRANSPORT DEVICE
Filed June 27, 1966  2 Sheets-Sheet 1

INVENTOR
KENNETH L. TREIBER

BY

ATTORNEYS

Feb. 13, 1968   K. L. TREIBER   3,368,822
ROLLING FUEL TRANSPORT DEVICE

Filed June 27, 1966   2 Sheets-Sheet 2

INVENTOR
KENNETH L. TREIBER

BY Harry M. Saragovitz
Edward J. Kelly
Herbert Berl
John W. Poteet, Jr.
ATTORNEYS 3,368,822
ROLLING FUEL TRANSPORT DEVICE
Kenneth L. Treiber, 1103 Villamay Blvd.,
Alexandria, Va. 22307
Filed June 27, 1966, Ser. No. 561,678
8 Claims. (Cl. 280—5)

This invention described herein may be manufactured and used by or for the the Government of the United States of America for governmental purposes without the payment to me of any royalties thereon.

This invention relates generally to fuel tanks and, more particularly, to a novel fuel transport device.

In many civilian and military operations at construction projects, remote aircraft landing fields, amphibious landings and the like, it is necessary to transport fuel and other liquids from a central depot to isolated locations which can be reached by passage over soft, rocky, swampy, sandy, snowy, areas (or terrain); that is, where there is no pavement. It is also necessary that some automotive equipment, such as tanks, trucks, bull-dozers and the like, carry their own extra fuel to areas which are remote from the supply. In the prior devices for transporting fuel over non-paved terrain, axles through such fuel tanks were provided. This axle necessitated the use of special rotary seals that are sources of leakages due to wear resulting in loss of fuel and creating a hazardous situation. The maintenance of such prior devices is difficult and expensive as is the initial cost. A reasonable assurance of reliable service from the prior devices is often lacking.

It is, therefore, an object of this invention to provide an improved fuel transport device.

A second object of this invention is to provide a fuel device which is capable of transporting fuel over rough terrain.

It is another object of this invention to provide a fuel transport device which is readily towed by automotive equipment.

Still another object of this invention is to provide an improved fuel transport device which does not require axles therethrough nor the accompanying rotary seals.

A further object of this invention is to provide an improved fuel transport device in which the hazardous aspects are minimized.

Another object of this invention is to provide a low maintenance and inexpensive fuel transport device having a high degree of reliability.

The exact nature of this invention as well as other objects and advantages thereof will be readily apparent from consideration of the following specification relating to the annexed drawing in which.

FIGS. 6, 7, 8, and 9 show details of the fueling structure of this invention.

Figure 10:
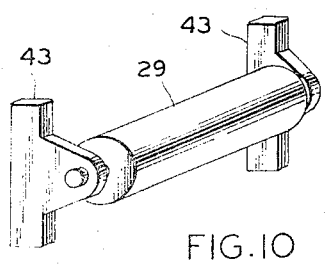
Figure 11:
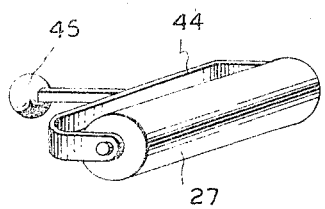

FIGS. 10 and 11 show roller support details.

Briefly, this invention relates to a transportable fuel container which is substantially spherical in shape and is made of resilient fuel-proof material capable of withstanding wear in the same manner as a vehicle tire. This sphere is provided with flush, self-sealing fueling and defueling means whereby any area of the surface of the sphere is capable of being in contact with the surface being rolled over without loss of fuel and without damage. The spherical container is rolled along behind an automotive vehicle by a coupling means containing rollers which are ball-joint mounted so as to be able to swivel freely. These rollers are located at strategic points within a frame or hood means so as to provide full rolling freedom to the container and to provide secure attachment of the frame or hood means to the coupling means to the vehicle. The coupling means can be rigidly mounted or the frame or hood means to the coupling means to the coupling means so long as the frame or hood means is not allowed to come in contact with the surface that the container rolls on.

Figure 1:
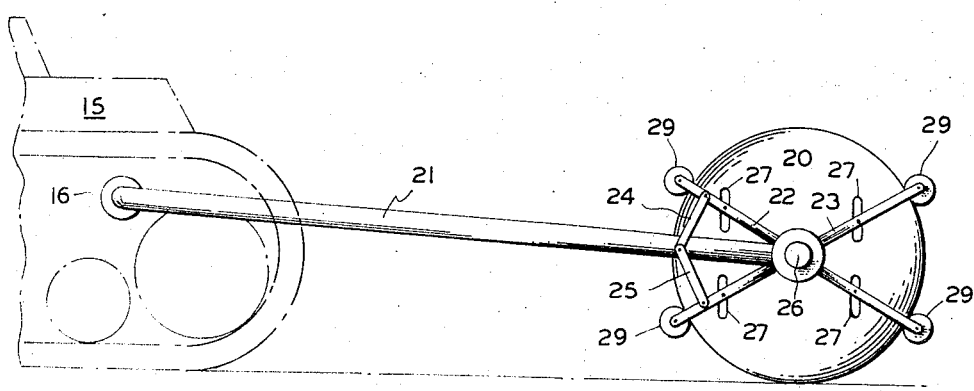
FIG. 1 is a side view of the first embodiment of this invention.

FIG. 1 shows a typical embodiment of this invention where a tank 15 or other vehicle with a rigid draw bar 21 pivotally connected to trunnion 16 ot its front end and to an anchoring means 26 on a frame means. The frame means is made up of a pair of cross members 22 and 23 intersecting on pivot means 26. These cross members are secured to the rigid draw bar 21 by brace means 24 and 25 so that the frame means will not rotate about pivot means 26. There is a duplication of the parts set forth in this paragraph for the other side of the tank 15. Between corresponding ends of the cross members 22 and 23, rollers 29 are pivotally mounted in a direction perpendicular to the direction of movement of the vehicle. Within the rollers 29 is located the fuel container 20 with the dimension of the container, the cross pieces, and the rollers being such that the container is secured within the rollers. Side rollers 27 are mounted on swivel bases on the cross members 22 and 23 such that the fuel container 20 is limited in its sideward movement while being rolled. Rollers 27 have full freedom to accommodate for the requirements of motion by the fuel container 20. The fuel container may be located in front or in back of tank 15.

Figure 2:
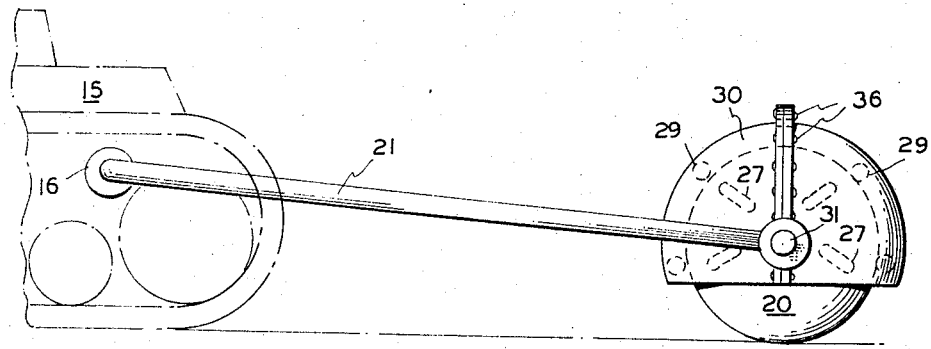
FIG. 2 is a perspective view of a second embodiment of this invention.

FIG. 2 shows a trunnion mounted draw bar connection to the front or back of vehicle 15 with the frame means of FIG. 1 being replaced by a bullet proof half sphere cover 30. The pivoted rollers 29 and the swivel rollers 27 cooperate to provide rolling motion for fuel container 20.

Figure 3:
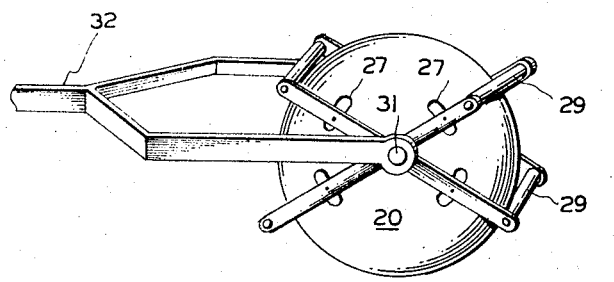
FIG. 3 is a side view of another embodiment of this invention.

FIG. 3 shows a yoke type draw bar 32 which is pivotally secured to the rear or the front of a vehicle and is secured to the frame members at yoke ends such as end 31 shown. Rollers 27 and 29 locate the fuel container 20 for free rolling motion over the surface to be crossed.

Figure 4:
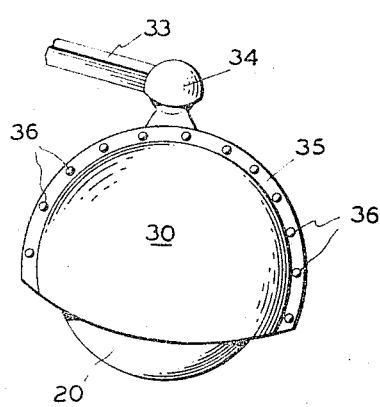
FIG. 4 is a perspective view of still another embodiment of this invention.
Figure 5:
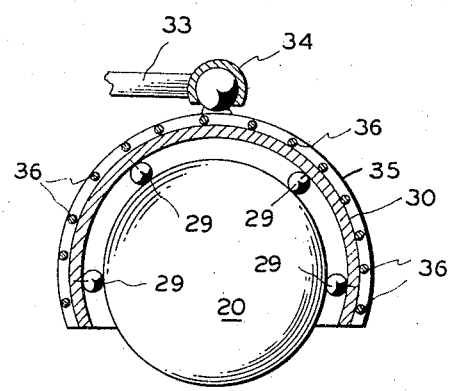
FIG. 5 is a sectional view of the species of FIG. 4.

FIGS. 4 and 5 show a bullet proof section of a sphere 30 covering most of fuel container 20. This modification differs from that shown in FIGURE 2 in that the partial sphere 30 is pivoted to draw bar 33 by a ball and socket means 34. Similar pivoting means are provided in the middle of the back of the towing vehicle to permit full freedom of the fuel container 20 to follow the vehicle in any path required by the surface to be crossed. Instead of a solid cover, the cover 30 may be made in sections and provided with lips 35 that are joined by securing means 36 therethrough. Securing means 36 can be rivets, bolts or the like. Rollers 29 are utilized as in the other modifications.

Figure 6:
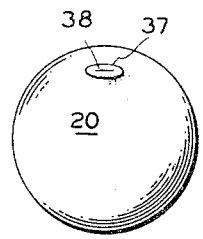

FIG. 6 shows the fuel container 20 which is spherical in shape and which is provided with a valve 37 having a slit therein for the insertion of the fuel saber type probe to fill or empty the container. The fuel container 20 is made of materials similar to the materials used in an air inflatable tire except these materials are resistant to petroleum products to be carried in said container. These products include engine and turbine fuels.

In a typical embodiment, fuel container 20 can have an outside covering of approximately three sixteenths of an inch of neoprene. Four layers of nylon fabric which is impregnated with chemigum and separated by a sheet one thirty second of an an inch thick support the outer surface and an inner liner of one eight inch of chemigum completes the container structure. The total thickness of this example is seventeen thirty seconds of an inch. This structure gives the container a burst of strength of eighty pounds per square inch and will operate when inflated from five to twenty pounds per square inch.

Figure 7:
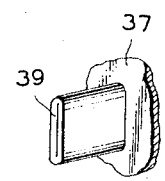
Figure 9:
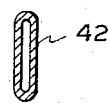
Figure 8:
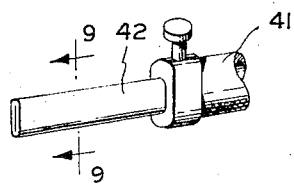

FIG. 7 shows the valve 37 structure that is in the interior of the fuel container. Slot 39 is the inner end of slot 38. FIG. 8 shows the nozzle of the fuel loader or unloader with fuel entering or leaving through hose 41 through probe 42. Probe 42 is oval shaped with a tapered end to be inserted in slot 38 and is long enough to reach into the interior of the container beyond end 39 of the slit valve. FIGURE 9 shows the cross sectional configuration of the probe 42.

FIG. 10 shows a detailed view of the mounting of the rollers 29 by brackets 43 which are readily secured to the partial sphere 30.

FIG. 11 shows the detail of the mounting of swivel roller 27 in a holder 44 which is swivelly mounted by ball 45 into a socket structure either within the partial sphere 30 or on the frame members 22 and 23.

The rollers 27 and 29 may be dipped in neoprene so as to be soft. An alternate coating would be with Teflon in applications that require resistance to abrasive action.

Shell 30 can be made of bullet proof materials which are determined by the requirements of the hazards to which the partial sphere 30 is subjected.

I have provided an improved fuel transport device which is capable of transporting fuel over rough terrain as set forth in the objects. Provision is made for protection of the fuel transport device from enemy action. The fuel transport device is supported in such a way there are no axle therethrough nor any rotary seals required by such axles, and the like.

Obviously many modifications and variations of the present invention are possible in the light of the above teachings. It is therefore to be understood, that within the scope of the appended claims, the invention may be practiced otherwise than as specifically described.

What is claimed is:

1. In a fuel transport device, spherical container means for holding liquid fuel, a frame means overlying said container and having roller means for contacting any part of the outer surface of said spherical means, pivot means secured to said frame means, and rigid connecting means pivoted on said pivot means at one end thereof and provided with means on the other end thereof for attachment to a motion providing vehicle.

2. The fuel transport device of claim 1 in which said frame means comprises a protective encasement for said spherical means.

3. The fuel transport device of claim 2 in which said pivot means is secured at the uppermost portion of said protective encasement.

4. The fuel transport device of claim 2 in which a pair of pivot means are provided and a pair of rigid connecting means are connected thereto.

5. The fuel transport device of claim 1 in which said spherical container means includes a fuel loading means including a slit valve means which is dependent upon internal hydraulic pressure for the sealing thereof.

6. The fuel transport device of claim 1 in which said rigid connecting means is in the form of a single metal bar.

7. The fuel transport device of claim 1 in which said rigid connecting means is in the form of a pair of metal bars.

8. The fuel transport device of claim 1 in which said rigid connecting means is in the form of a yoke means.

References Cited

UNITED STATES PATENTS

| 1,394,328 | 10/1921 | Miller. | |
| 2,714,011 | 7/1955 | Albee | 280—1 |
| 3,059,942 | 10/1962 | Kirk et al. | 280—5 |
| 3,169,581 | 2/1965 | Cummins | 169—24 |
| 3,211,465 | 10/1965 | Colvin | 280—5 |
| 3,306,626 | 2/1967 | Kawada | 280—205 |

FOREIGN PATENTS

| 101,076 | 5/1937 | Australia. |
| 478,549 | 2/1953 | Italy. |

LEO FRIAGLIA, *Primary Examiner.*